United States Patent
Manlove

Patent Number: 6,086,800
Date of Patent: *Jul. 11, 2000

[54] THERMOFORMING PROCESS AND APPARATUS

[75] Inventor: Steven F. Manlove, Odenton, Md.

[73] Assignee: ICON Engineering, Inc., Odenton, Md.

[*] Notice: This patent is subject to a terminal disclaimer.

[21] Appl. No.: 09/164,493

[22] Filed: Feb. 23, 1998

Related U.S. Application Data

[63] Continuation of application No. 08/312,090, Sep. 26, 1994, Pat. No. 5,783,229, which is a continuation-in-part of application No. 08/266,564, Jun. 28, 1994, Pat. No. 5,459,960, which is a continuation-in-part of application No. 08/120,955, Sep. 15, 1993, abandoned.

[51] Int. Cl.[7] .............................. B29C 51/22; B29C 51/44
[52] U.S. Cl. ........................ 264/37.32; 264/550; 264/551; 264/555; 264/334; 425/326.1; 425/387.1; 425/388; 425/443
[58] Field of Search ..................... 264/550, 551, 264/554, 555, 334; 425/398, 183, 387.1, 326.1, 441, 443

[56] References Cited

U.S. PATENT DOCUMENTS

| | | | |
|---|---|---|---|
| 3,181,202 | 5/1965 | Martelli et al. | 264/551 |
| 4,235,579 | 11/1980 | Kurz et al. | 264/550 |
| 4,250,129 | 2/1981 | Winstead | 264/551 |
| 4,421,712 | 12/1983 | Winstead | 264/555 |
| 4,722,820 | 2/1988 | Flecknoe-Brown | 264/551 |
| 4,994,229 | 2/1991 | Flecknoe-Brown | 264/550 |

*Primary Examiner*—Catherine Timm
*Attorney, Agent, or Firm*—Knoble & Yoshida LLC

[57] ABSTRACT

This invention is an improved thermoforming process and apparatus for the production of rigid plastic containers. The apparatus employs a molten sheet of thermoplastic material that is processed through two extrusion rolls, thermoformed on the periphery of a rotating form tool, mechanically ejected from the form tool, conveyed to a conventional punch press where the formed articles are trimmed from the sheet then packaged for shipment. The operation of the extruder, extrusion rolls, forming wheel, mechanical ejection and trim stations are operated as a continuous, integrated system.

15 Claims, 7 Drawing Sheets

THERMOFORMING PROCESS AND APPARATUS

This is a continuation in part of application Ser. No. 08/312,090, filed Sep. 26, 1994, now U.S. Pat. No. 5,783, 229, which is in turn a continuation in part of application Ser. No. 08/266,564, filed Jun. 28, 1994, now U.S. Pat. No. 5,459,960, which is a continuation in part of application Ser. No. 08/120,955, filed Sep. 15, 1993, now abandoned.

BACKGROUND OF THE INVENTION

1. Field of the Invention

This invention relates to the art of thermoforming rigid plastic articles and more particularly plastic containers.

2. Description of Prior Art

It is well known in the art that rigid plastic containers are manufactured from a thermoplastic sheet. The sheet is stripped from a pre-manufactured roll, reheated to a suitable forming temperature then indexed horizontally through a vacuum and or pressure forming station. After fonning, the articles may be trimmed while still inside the form tool, or stripped as an integral part of the sheet then indexed through a shearing station where the articles are separated from the sheet. This type of process is commonly referred to as Flat Bed Thermoforming and is described in U.S. Pat. Nos. 3,470,281, 3,578,735 and 3,600,753.

U.S. Pat. Nos. 2,902,718, 3,181,202, 3,518,725, 3,667, 889, 3,771,938 each describe a means to thermoform shallow containers from thermoplastic sheet. The sheet is stripped from a premanufactured roll and continuously fed over the surface of a rotating drum comprising a plurality of vacuum forming mold cavities. During the time that the sheet is on the drum it is reheated to a suitable forming temperature and a vacuum is systematically applied to each mold cavity to form the articles. These patents are limited to the production of shallow trays and lids. Furthermore, each machine's production speed is limited by each apparatus' lack of heat transfer efficiency which is due to the reliance on the circulation of ambient air across the formed sheet.

U.S. Pat. No. 4,061,706 describes a process for the continuous melt thermoforming of polymers. This process utilizes a continuous sheet of molten plastic that is extruded and vacuum formed on a continuous belt or a rotating drum comprising a plurality of mold cavities. By utilizing the residual heat from the extrusion process, the need to reheat the plastic sheet prior to thermoforming is eliminated. By its' own description this patent is limited to the production of shallow trays. Furthermore the use of porous metal for the construction of the mold cavities is not practical. Eventually gases from the molten sheet will condense in the pores and decrease the mold's ability to draw a vacuum and form a quality product.

U.S. Pat. Nos. 3,027,596 and 3,071,812 each describe an apparatus for vacuum forming dished and flat articles. Each patent utilizes a continuous sheet of molten plastic that is extruded and vacuum formed on a rotating drum comprising a plurality of mold cavities. By utilizing the residual heat from the extrusion process the need to reheat the plastic sheet prior to thermoforming eliminated. The problem with these patents is that they are limited to the production of shallow trays and lids. Since the mold cavitv's position is fixed, the removal of an article, like a drinking cup or food container as an integral part of the sheet, would result in a distorted flange, dented heel and scratched sidewall, especially with those articles with a depth greater than 50% of the opening of the container. Furthermore, each system's production speed is limited by the apparatus' lack of heat transfer efficiency. In known thermoforming methods, water is circulated around the form tool to provide proper heat transfer from the plastic article. U.S. Pat. No. 3,027,596 relies on the temperature of ambient air to cool the plastic. U.S. Pat. No. 3,071,812 relies on water circulating three surface laminations beneath the actual forming surface of the mold. Each laminated surface creates a level of insulation from the chilled water resulting in the loss of efficient heat transfer.

U.S. Pat. No. 4,235,579 describes a continuous method of manufacturing plastic articles. The molding station described in this patent utilizes a continuous annular tube of molten plastic which is drawn through a roll mechanism to collapse the tube into a flat, double walled web. Utilizing the residual heat from the extrusion process the web is pressure formed on a continuously rotating drum which holds a plurality of pressure boxes about its' circumference, each containing one assist plug assembly. The web is positioned over each pressure box assembly at a rate equal to the molten web's extrusion speed. The mold cavity which is an integral part of each pressure box is then pivoted over the web and clamped to the pressure box. The part is pressure formed and resides on the drum for approximately 180 degrees. At this point the mold pivots open to permit the web and formed article to be stripped from the drum. Because of the inertia's involved in operating a pivoting mold assembly, this system becomes cumbersome at higher speeds. This system does not utilize a vacuum to assist in forming the product, only pressure is used. This limits the amount of definition that can be imparted into the product and it also reduces the heat transfer efficiency of the mold cavity. Furthermore the system's production output is limited by the use of a narrow plastic web and a single lane of form tooling.

Figure 1:
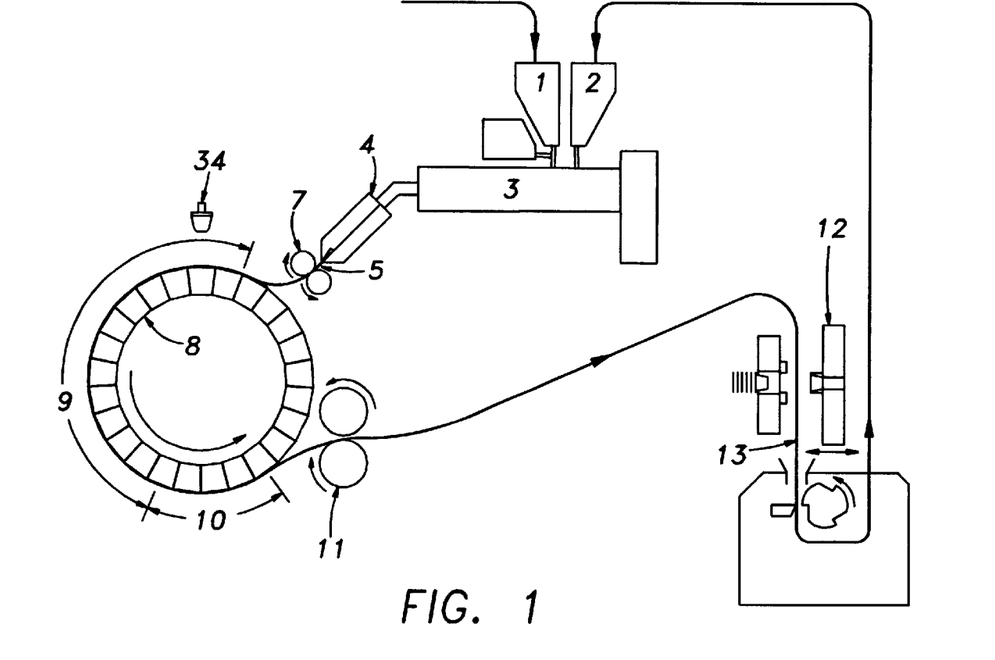
FIG. 1 is a schematic of the thermoforming process and apparatus'
Figure 3:
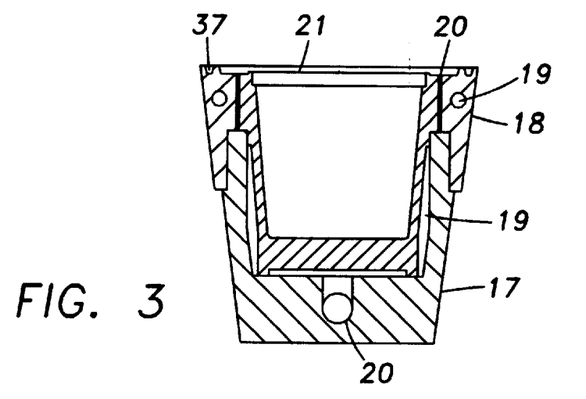
FIG. 3 is a section view of a typical form tool in its' normal forming position taken in the machine direction.

U.S. Pat. No. 4,421,712 describes a continuous rotary thermoforming system. This process utilizes a continuous sheet of molten plastic that is extruded between; a rotating drum comprising a plurality of vacuum forming mold cavities, and a caterpillar like array of tooling made up of a pressure box, assist plug assemblies and in some cases matched molds. By utilizing the residual heat from the extrusion process, the need to reheat the plastic sheet prior to thermoforming is eliminated. The complexity of this system dictates expensive re-tooling and maintenance costs. Furthermore this system is limited to the production of shallow trays. Since the mold cavity's position is fixed, the removal of an article like a drinking cup or food container as an integral part of the sheet (as shown in FIGS. 1, 3 and 17) would result in a distorted flange, dented heel and scratched sidewall, especially for those articles with a depth greater than 50% of the opening of the container.

U.S. Pat. No. 4,722,820 describes a process for the feeding of a molten thermoplastic web directly and continuously into a thermoforming machine. Molten thermoplastic material is required to be fed horizontally through a pair of temperature controlled rolls that gauge the material thickness and pre-cool the plastic sheet prior to entering the thermoformer. The material is fed horizontally from the rolls directly and continuously under uniform tension without any means to support the soft, sagging, sheet as it is fed into a thermoforming machine. Extruded polypropylene and other similar thermoplastics are susceptible to sagging as the material reaches and exceeds the crystalline melting point. Variations in the material's melt strength are caused by changes in extrusion temperature, roll temperatures, changes in extrusion rate, and variations in the material's reology. To compensate for these variables and maintain the uniform tension required to properly transfer the sheet to the thermoformer, the speed of the thermoformer must be maintained at a faster rate than the rolls to prevent the material from sagging and adversely affecting the gauge of the sheet. This is especially true when processing thick and heavy plastic sheets. Care must be taken to avoid excessive speed in the thermoformer so that the sheet is not over tensioned adversely affecting the performance of the rolls and causing a change the gauge of the sheet. Furthermore, when starting up the thermoforming line the machine operator's hands must take hold of the molten sheet as it exits the sheet extrusion die and thread it between the rotating rolls and then onto the rotating members of the thermoforming machine described in the patent as a series of moving punches and dies. This start up procedure is performed at the risk to the operators safety.

U.S. Pat. No. 4,994,229 describes a process for forming thermoplastic material. This invention provides a solution to the problems associated with U.S. Pat. No. 4,722,820 by providing a means of supporting the soft, sagging molten sheet and transporting it to a thermoformer via an intricate conveyor belt system. The mechanical complexity of this belt conveyor system is further complicated by the necessity to regulate the temperature and speed of the belt to slow down or speed up the rate of reheating the plastic sheet to ensure that the molten plastic does not wet the belt and adhere to it. Furthermore, reheating the material should substantially occur before it enters the forming station for uniform, stress-free forming to result. Additional energy is required to reheat the material's underside of the sheet, or the side of the sheet that was in contact with the belt. This prior art does not address the safety risks associated with an operator threading molten sheet from the extrusion die through a series of counter rotating rolls and into a thermoformer.

U.S. Pat. No. 5,106,567 describes a continuous rotary thermoforming system. This process utilizes a continuous sheet of molten polyethylene terephthalate plastic that is extruded and vacuum formed on a rotating drum comprising a plurality of mold cavities around its' circumference. The residual heat from the extrusion process eliminates the need to reheat the plastic sheet prior to thermoforming. This patent describes a unique method of distributing, vacuum forming, and then crystallizing polyethylene terephthalate. The problem with this patent is that it is limited to the production of shallow trays and lids. Since the mold cavity's position is fixed, the removal an article like a drinking cup or food container as an integral part of the sheet, would result in a distorted flange, dented heel and scratched sidewall. This is especially the case in those articles having a depth greater than 50% of the opening of the container. Therefore, the process described in this prior patent is limited to the production of shallow polyethylene terephthalate trays that have a degree of crystallinity of at least twenty percent.

The mechanical arrangements and processes of all the known prior art systems solely result in the manufacture a particular size and shape of plastic article at a specific extrusion throughput. A major deterrent to the proliferation in the use of these prior technologies is the inflexibility of the apparatus and the extreme expense of fabricating a customized forming tool, or an entirely new and unique forming apparatus to accommodate a particular extrusion throughput for a new and different size and shape of plastic article intended to be manufactured. The molds described in the prior art are an integral part of the forming apparatus and are not easily removed to reconfigure the forming apparatus for the production of an alternate size and shape of plastic article. Furthermore, a change in the size of a plastic article may require a radical change in the diameter of the forming wheel. A radical change in the forming wheel's diameter without changing the location of the forming wheel's axis can adversely affect the distance between the surface of the molds and the sheet extrusion die rendering the apparatus useless. If too great of a distance exists between the molds and extrusion die, adequate control over the width, thickness and positioning of the plastic sheet on the forming tool is lost. Certainly a small plastic article can be produced on a larger forming wheel but this would always be done at the expense of a negative finished product to scrap ratio and the subsequent creation of excess extruded sheet and forming scrap.

By the present invention an improved process and apparatus for thermoforming is provided whereby a wide variety of plastic articles such as drinking cups, closures and food containers, with depths greater than 50% of the opening of the container, can be manufactured in a continuous manner on a rotating form tool. Furthermore the present invention provides for a continuous thermoforming system that is not a permanently configured for a particular size and shape of plastic article, is easily and economically transformed via change tooling to produce different sizes and shapes of plastic articles with the added capability to utilize various sheet extrusion throughputs efficiently. The present invention also provides a unique configuration of forming apparatus that permits the safe and efficient start up and operation of an extrusion system, the threading of molten plastic sheet through a set or series of temperature control rolls and onto a continuous thermoformer.

SUMMARY OF THE INVENTION

It is a principle object of this invention to provide an improved process and apparatus for thermoforming rigid plastic articles.

It is a second object of this invention to manufacture thermoplastic articles at a relatively low cost by utilizing a simple continuous thermoforming process and apparatus. This is in contrast with conventional flat bed thermoforming which relies upon the reheating of pre-manufactured sheet and the discontinuous motion of indexing a thermoplastic sheet through an oven and molding apparatus. The improved process disclosed herein is also in contrast to the continuous rotary thermoforming methods that are limited to the production of shall trays and lids, or to the use of a single lane of tooling, or inefficient methods of heat transfer. The present process does not require expensive and cumbersome matching form tooling apparatus, or expensive and cumbersome sheet feeding apparatus. The present process is not limited by a fixed forming machine configuration that prevents the practical reconfiguration of the apparatus for the subsequent manufacture of other sizes and shapes of articles.

It is also an object of this invention to provide a continuous thermoforming apparatus whereby the mechanical ejection of the mold cavity from the formed article is performed thus permitting the non-destructive removal of a deep drawn article having a depth greater than 50% of the top opening dimension of the article from a rotating forming wheel, while maintaining the forming wheel's circumference so that the surface of each facet is utilized as the mechanism to strip each formed article from the mold cavity and to permit the removal of the thermoformed article as an integral part of the sheet from the forming wheel.

Another object of this invention is to provide a continuous thermoforming apparatus whereby the differential expansion between the molding facets and the forming wheel's axle or support assembly is compensated for to permit the said mechanical ejection of the mold cavity.

Another object of this invention to provide a continuous thermoforming system and apparatus whereby the system's configuration permits the simple transformation from a small diameter forming wheel to a larger one while utilizing the original fixed extrusion die elevation and orientation.

A further object of this invention is to provide a continuous thermoforming system whereby two temperature controlled extrusion rolls are positioned after the extrusion die in such a way as to permit the safe threading of the molten sheet as it exits the extrusion die, through the extrusion rolls and onto the continuous thermoforming apparatus.

Yet a further object of this invention is to provide a continuous thermoforming system and forming wheel support whereby two counter rotating chill rolls are positioned in such a way as to permit the use of different forming wheel diameters while maintaining a relatively constant distance between the surface of the forming wheel and said rolls.

Yet another object of this invention is to provide a continuous thermoforming system and apparatus whereby the form tool configuration permits the simple access to each mold facet from the surface of the forming wheel with the minimum of inconvenience for periodical maintenance and product interchangeability.

It is also an object of this invention to provide a continuous thermoforming apparatus whereby the mechanical ejection of the mold cavity from the formed article is performed thus permitting the non-destructive removal of a lid or deep drawn article having a depth or cross section greater than 30% of the top opening dimension of the article from a rotating forming wheel, while maintaining the forming wheel's circumference so that the surface of each facet is utilized as the mechanism to strip each formed article from the mold cavity and to permit the removal of the thermoformed article as an integral part of the sheet from the forming wheel.

Another object of this invention is to provide a continuous thermoforming system and apparatus whereby the residence time of the formed article in the mold cavity can be regulated Yet another object of this invention is to provide a continuous thermoforming system and apparatus whereby alternate methods for mechanically ejecting the mold cavity from the formed articles are used.

A further object of this invention is to provide a simplified method for trimming formed articles whereby the formed articles remain organized on the forming wheel to allow for improved cutting accuracy while minimizing production costs associated with the maintenance of heavy mechanical trim tooling and equipment.

These and other objects of the present invention will be understood by those skilled in the art upon review of the attached drawings and detailed description of the later claimed thermoforming process, and the new apparatus for carrying out said process.

DESCRIPTION OF THE PREFERRED EMBODIMENT

Referring now to the application's drawings particularly FIG. 1, there is shown a schematic of the continuous thermoforming process and apparatus of this patent. The process begins with a blend of pelletized virgin material 1 and reclaimed unformed sheet scrap 2. These materials are blended and processed through an extrusion system 3 of an appropriate design exiting an extrusion die 4 as a molten thermoplastic sheet 5 in the appropriate thickness and width for the forming wheel 6 being used. The molten thermoplastic sheet 5 is immediately fed through a pair of extrusion rolls 7.

Once the thermoplastic sheet 5 leaves the extrusion rolls 7 it is immediately cast onto a rotating forming wheel 6. The forming wheel is constructed of a plurality of mold facets 8. Each mold facet 8 holds at least one mold cavity 21. The surface speed of the forming wheel 6 is synchronized with the extrusion roll's 7 surface speed. As the forming wheel 6 rotates, the thermoplastic sheet 5 covers each mold facet 8. The thermoplastic sheet 5 is held into place by a vacuum groove 37 located on the surface of each mold facet 8. Each mold facet 8 is advanced into the forming station 9. Using residual heat that remains in the thermoplastic sheet 5, the articles are formed by actuating the assist plug 34 into the unformed thermoplastic sheet 5 and mold cavity 21. The actuation of the assist plug 34 in combination with a controlled evacuation of air from the mold cavity form the thermoplastic sheet 5 into an article. The formed article and the unformed area of the sheet reside on the forming wheel 6 for a length of time consistent with the rotating speed of the forming wheel and are then cooled. When the formed articles and unformed area of sheet 5 advance to the ejection station 10, the unformed portion of the sheet 5 remains on the surface of the mold facet 8 holding the formed article stationary as the mold cavity 21 is moved toward the axis of the forming wheel 6. The sheet and formed articles are then removed from the forming wheel 6 by the sheet take-off unit 11.

The formed articles and unformed area of the sheet are then conveyed to a punch press 12 where the formed articles are separated from the unformed area of sheet and are packed into shipping cartons. The unformed area of sheet 13 is ground up and conveyed back to the extrusion system 3 for re-use as shown in FIG. 1.

Figure 2:
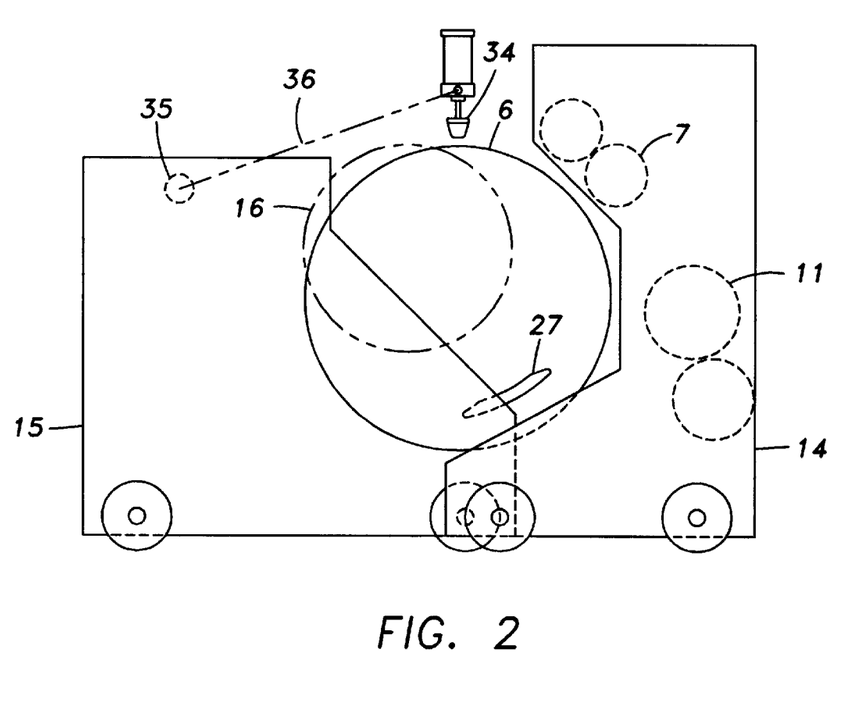
FIG. 2 is a schematic of the extrusion roll stand and container forming apparatus.

Referring now to FIG. 2, a preferred embodiment of this invention is the general configuration of the extrusion die 4, extrusion roll stand 14 and thermoforming apparatus 15 whereby the axis of each extrusion roll 7 is arranged on a plane that is approximately 45 degrees from the vertical and perpendicular to the extrusion die so as to feed the molten thermoplastic sheet 5 down and away from the extrusion die. This extrusion roll 7 configuration permits the automatic feeding of molten thermoplastic sheet 5 from the extrusion die 4, through the extrusion rolls 7 so as to cast the sheet 5 onto the forming drum 6 without reheating the sheet or utilizing other means to transfer the thermoplastic sheet to the thermoformer. This configuration also facilitates the use of alternate sized forming wheels 16 with a fixed extrusion die 4 position.

The forming wheel 6 is mounted on a surface that is parallel to the plane defined by the extrusion rolls. This configuration permits a small forming wheel 16 to be mounted higher on the thermoformer so as to maintain the same height as a larger forming wheel 6. It is a simple matter to move the thermoformer closer to the extrusion rolls 7 to achieve the same sheet pick up point as a larger forming wheel 6 without relocating the extrusion die or building a new thermoformer.

The thermoforming assist plug 34, and the assist plug carriage 36, oscillate within the forming station and is driven by a means 35 that imparts the necessary constant acceleration, constant deceleration and synchronous motion to the assist plug carriage 36.

Figure 4:
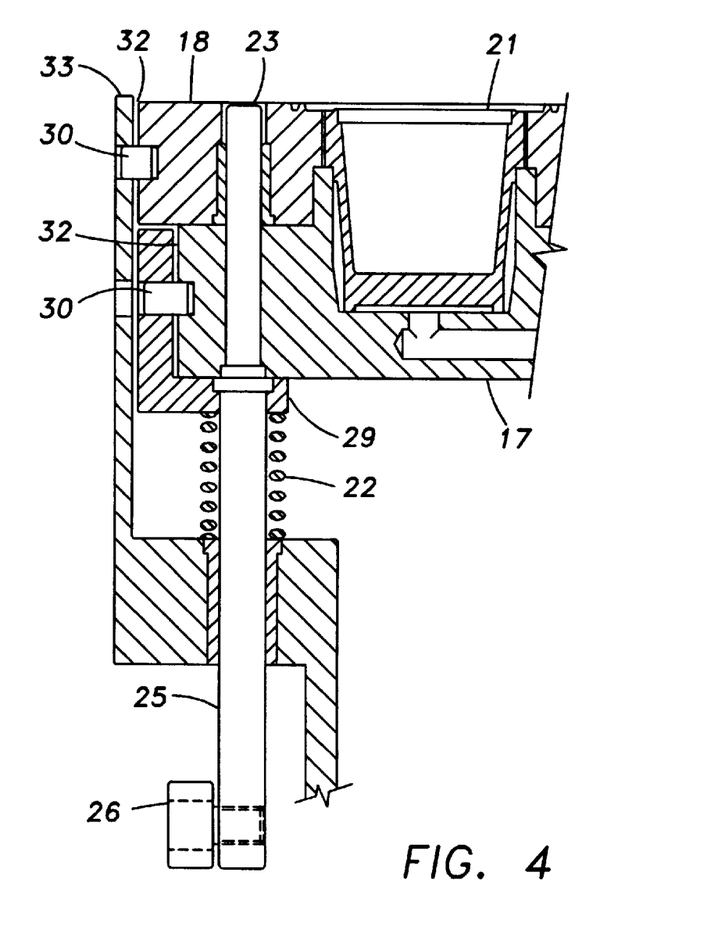
FIG. 4 is a sectional view of a typical form tool in its' normal forming position taken across the machine direction.

Referring now to FIGS. 3 and 4, there is shown a cross section of a mold facet 8. The mold facet 8 is constructed of a dynamic lower mold facet section 17 and a static upper mold facet section 18. These sections individually support circuits for circulating a temperature control medium 19, and a vacuum 20. The temperature control medium and vacuum are supplied through rotary valve assemblies located on the forming wheel's axle. The mold cavity 21 is mounted to the dynamic lower mold facet section 17. The dynamic lower section 17 is forced into place against the upper section 18 by springs 22 keeping the two facet sections together as they advance through the forming station. Alignment of the two mold facet sections is maintained by the pin and bushing assembly 23.

Figure 5:
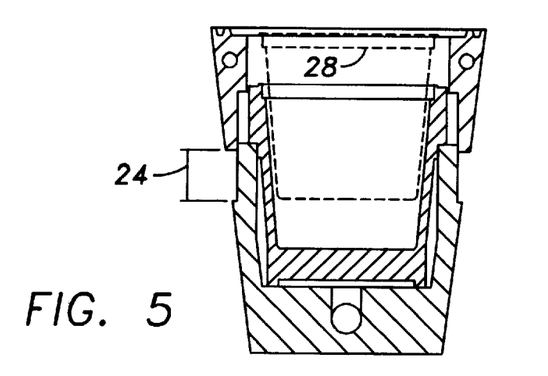
FIG. 5 is a sectional view taken of a typical form tool in its' fully extended ejection position taken in the machine direction.
Figure 6:
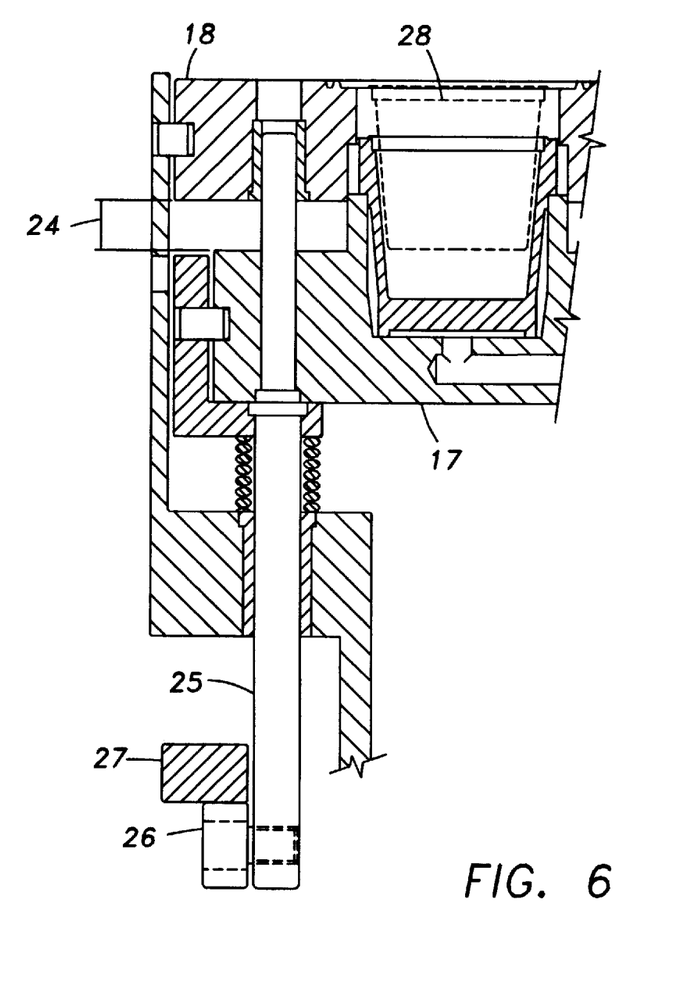
FIG. 6 is a section view taken of a typical form tool in its' fully extended ejection position taken across the machine direction.

Referring now to FIGS. 5 and 6 there is shown a cross section of a mold facet 8 in an extended position. This is the position of the dynamic lower mold facet section 17 while in the ejection station 10. The dynamic lower mold facet section 17 is pulled away from the stationary upper mold facet section 18, thus removing the mold cavity 21 from the formed articles 28 to permit the removal of the formed articles from the forming wheel 6 by the sheet take-off unit 11. The ejection stroke 24, or extension of the lower mold facet, occurs when the cam follower 26 comes into contact with a stationary ejection shoe 27 to pull the lower mold facet towards the axis of the forming wheel. As the forming wheel 6 continues to rotate, the cam follower 26 runs off of the stationary ejection shoe 27. Force from the collapsed spring returns the lower section 17 to the normally closed forming position as depicted in FIGS. 3 and 4.

The differential thermal expansion between the aluminum mold facets and the steel forming wheel axle components must be considered and compensated for to ensure a smooth motion between the static upper mold facet section 18 and dynamic lower mold facet sections 17. In an embodiment of this invention the differential thermal expansion is taken up by the guide rod heads 29 and lug assemblies 30. As the forming wheel 6 increases in temperature, the gaps at 31 and 32 decrease. The upper and lower mold facet sections are kept in place by the lug assemblies 30 which are free to move within the guide rod head 29 and end plate 33 to guide the expansion at one end of the assembly, the opposite ends of the upper and lower mold facet sections are fixed. The guide rod head 29 also serves as a mounting platform to accommodate the efficient assembly of the upper and lower mold facet sections to the forming wheel 6.

FIGS. 7, 8, 9 and 10 depict alternate methods of moving the dynamic lower section 17 away from the static upper mold facet section 18.

Figure 7:
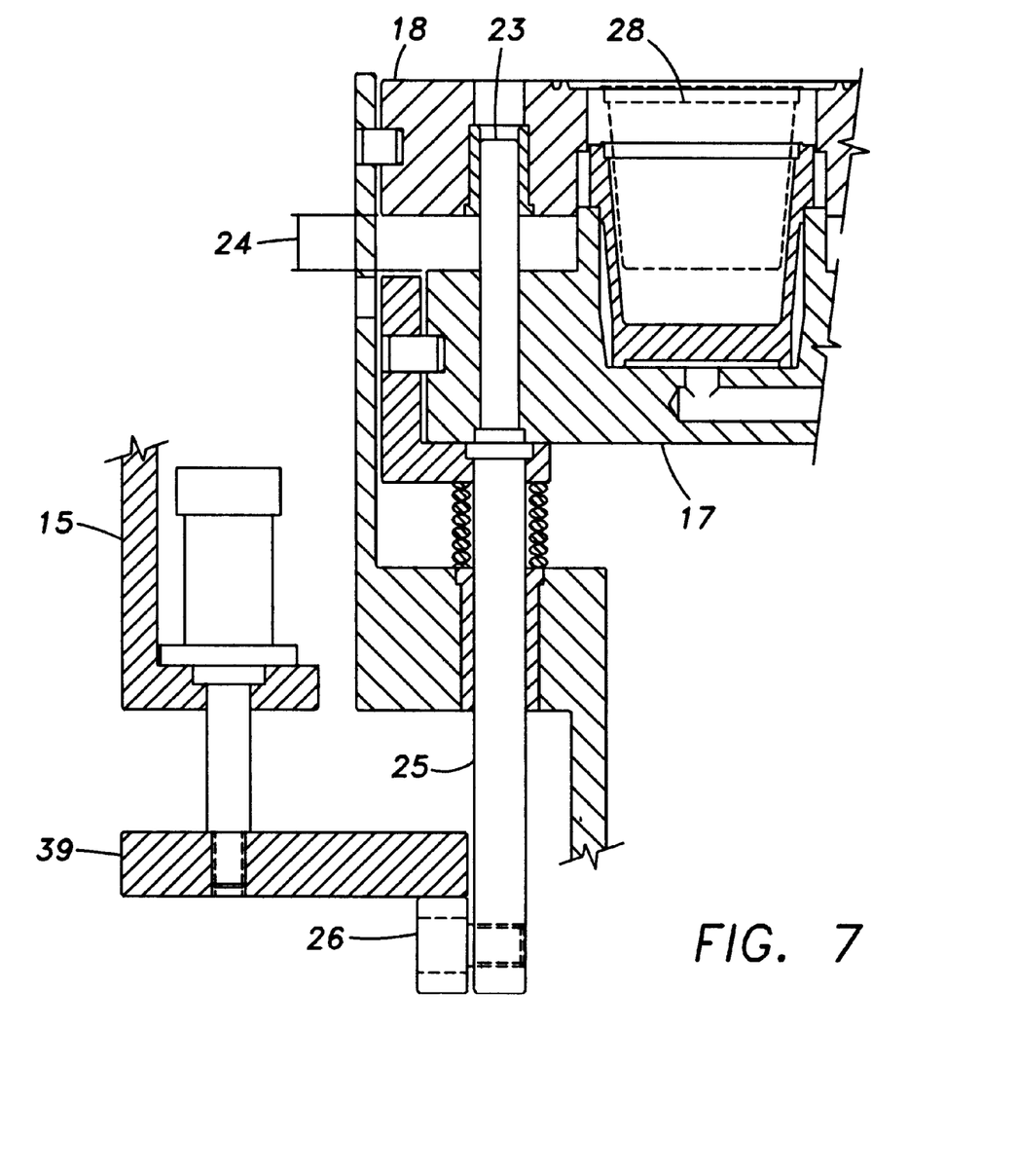
FIG. 7 is a sectional view taken of a typical form tool in its' fully extended ejection position taken across the machine direction showing the use of a stationary intermittent actuating device.

Referring now to FIG. 7 there is shown a stationary intermittent actuating device 39 mounted to the machine frame 15 in the ejection sector 10. The dynamic lower section 17 is forced into place against the upper section 18 by springs 22 keeping the two facet sections together, as depicted in FIGS. 3 and 4, as they advance through the forming station. Alignment of the two mold facet sections is maintained by the pin and bushing assembly 23. The dynamic lower mold facet section 17 is pulled away from the stationary upper mold facet section 18 as depicted in FIGS. 5 and 6, thus removing the mold cavity 21 from the formed articles 28 to permit the removal of the formed articles from the forming wheel 6 by the sheet take-off unit 11. The ejection stroke 24, or extension of the lower mold facet, occurs when the cam follower 26 comes into contact with a stationary intermittent actuating device 39 to push the lower mold facet towards the axis of the forming wheel. Force from the collapsed spring 22 returns the lower section 17 to the normally closed forming position as depicted in FIGS. 5 and 6.

Figure 8:
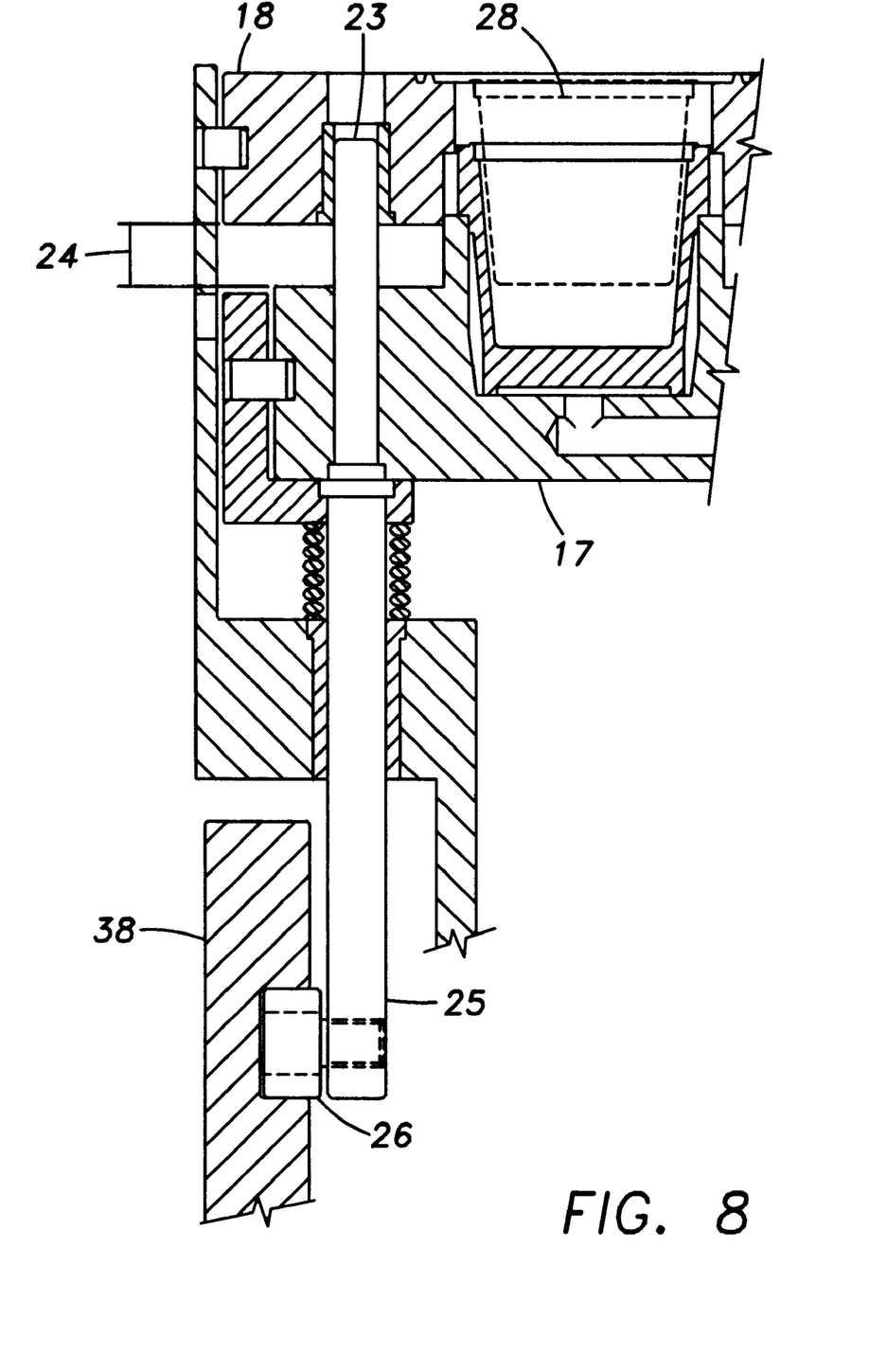
FIG. 8 is a sectional view taken of a typical form tool in its' fully extended ejection position taken across the machine direction showing the use of a stationary cam plate.

Referring now to FIG. 8 there is shown a stationary cam plate 38 mounted to the machine frame 15. As the forming wheel 6 rotates, the dynamic lower section 17 is forced into place against the upper section 18 while the cam follower 26 remains in the forming sector 9 of the stationary cam plate 38 keeping the two facet sections together as depicted in FIGS. 3 and 4, as they advance through the forming station. Alignment of the two mold facet sections is maintained by the pin and bushing assembly 23. As the forming wheel 6 rotates the dynamic lower mold facet section 17 is pulled away from the stationary upper mold facet section 18, as depicted in FIGS. 5 and 6, thus removing the mold cavity 21 from the formed articles 28 to permit the removal of the formed articles from the forming wheel 6 by the sheet take-off unit 11. The ejection stroke 24, or extension of the lower mold facet, occurs when the cam follower 26 makes the transition from the forming sector 9 to the ejection sector 10 of the stationary cam plate 38 to pull the lower mold facet towards the axis of the forming wheel. As the forming wheel 6 rotates the lower section 17 returns to the normally closed forming position, as depicted in FIGS. 5 and 6, when the cam follower 26 makes the transition from the ejection sector 10 to the forming sector of the stationary cam plate 38.

Figure 9:
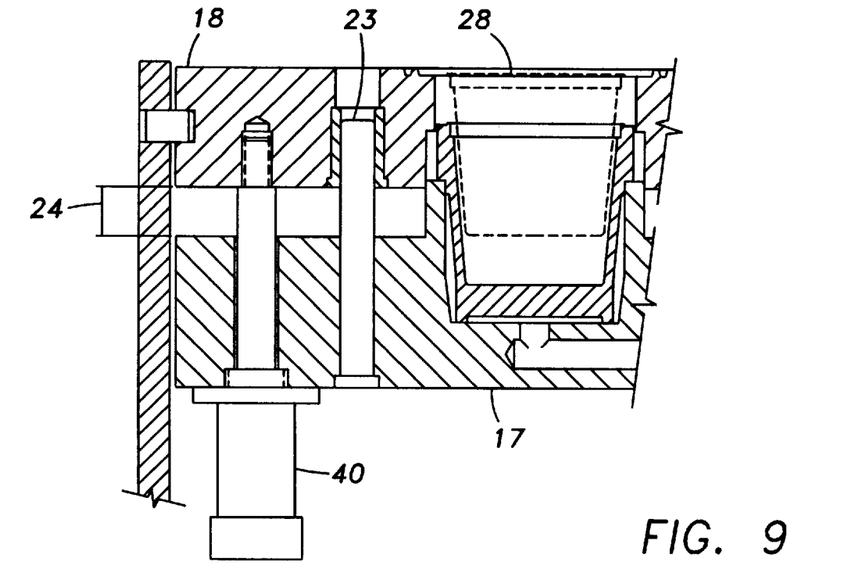
FIG. 9 is a sectional view taken of a typical form tool in its' fully extended ejection position taken across the machine direction showing the use of an actuating device mounted between upper and lower mold facet sections.

Referring now to FIG. 9 there is shown an intermittent actuating device 40 mounted on the dynamic lower mold facet section 17. The dynamic lower section 17 is forced into place against the upper section 18 by the intermittent actuating device 40 in its normally closed position keeping the two facet sections together as, depicted in FIGS. 3 & 4, as they advance through the forming station. Alignment of the two mold facet sections is maintained by the pin and bushing assembly 23. The dynamic lower mold facet section 17 is pulled away from the stationary upper mold facet section 18, as depicted in FIGS. 5 and 6, thus removing the mold cavity 21 from the formed articles 28 to permit the removal of the formed articles from the forming wheel 6 by the sheet take-off unit 11. The ejection stroke 24, or extension of the lower mold facet, occurs when the intermittent actuating device 40 is switched to its extended position to push the lower mold facet towards the axis of the forming wheel. The lower section 17 returns to the forming position, as depicted in FIGS. 5 and 6, when the intermittent actuating device 40 is switched to its normally closed position.

Figure 10:
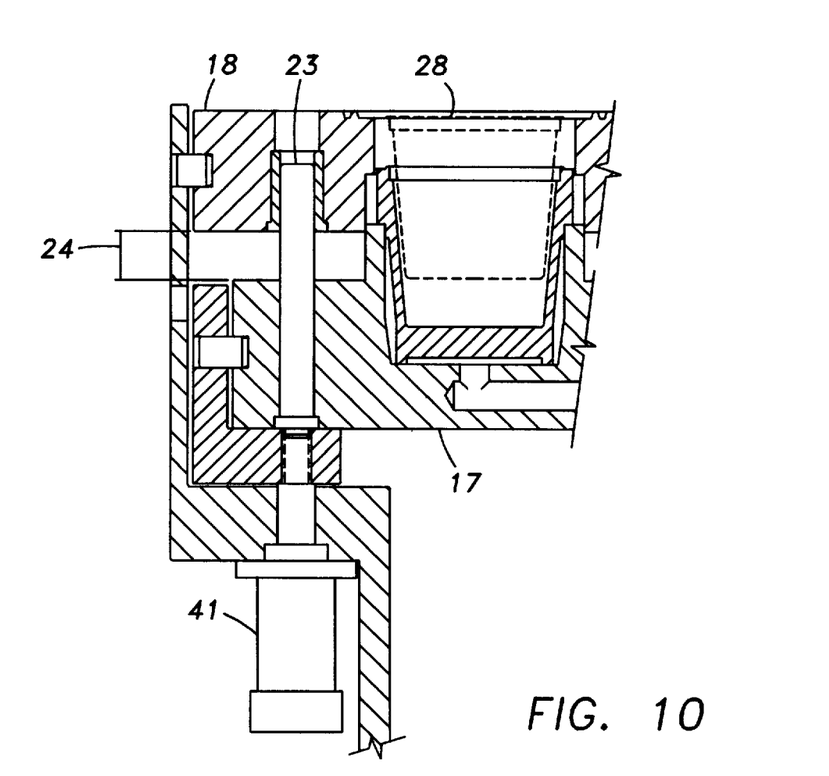
FIG. 10 is a sectional view taken of a typical form tool in its' fully extended ejection position taken across the machine direction showing the use of an actuating device mounted to the guide rod head.

Referring now to FIG. 10 there is shown an intermittent actuating device 41 mounted to the guide rod head 29. The dynamic lower section 17 is forced into place against the upper section 18 by the intermittent actuating device 41 in its extended position keeping the two facet sections together, as depicted in FIGS. 3 & 4, as they advance through the forming station. Alignment of the two mold facet sections is maintained by the pin and bushing assembly 23. The dynamic lower mold facet section 17 is pulled away from the stationary upper mold facet section 18, as depicted in FIGS. 5 and 6, thus removing the mold cavity 21 from the formed articles 28 to permit the removal of the formed articles from the forming wheel 6 by the sheet take-off unit 11. The ejection stroke 24, or extension of the lower mold facet, occurs when the intermittent actuating device 41 is switched to its normally closed position to push the lower mold facet towards the axis of the forming wheel. The lower section 17 returns to the forming position, as depicted in FIGS. 5 and 6, when the intermittent actuating device 41 is switched to its extended position.

Figure 11:
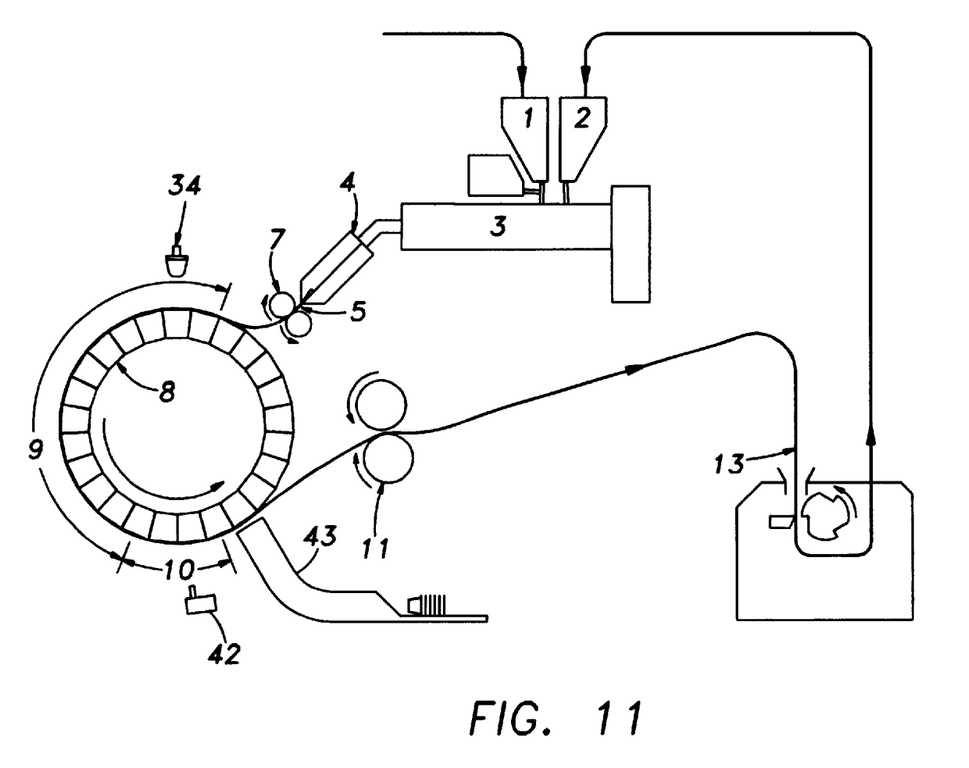
FIG. 11 is a schematic of the thermoforming process and apparatus' showing the use of insitu formed article trimming apparatus.

Referring now to FIG. 11 there is shown a schematic of the thermoforming system where a CO2 laser is 42 employed to cut out the formed articles 28 from the unformed portion of the sheet 5 while it remains on the forming wheel 6. The dynamic lower mold facet section 17 is pulled away from the stationary upper mold facet section 18, as depicted in FIGS. 5 and 6, thus removing the mold cavity 21 from the formed articles 28. The CO2 laser 42 is activated after the mold cavity 21 is separated from the formed articles 28. The forming wheel 6 advances with the cut out formed articles 28 to the product collection chute 43 where they are ejected from the forming wheel 6. The unformed portion of the sheet 5 is then removed from the forming wheel 6 by the sheet take off unit 11. The unformed area of sheet 13 is ground up and conveyed back to the extrusion system 3 for re-use as shown in FIG. 11. The assist plug carriage 36 is extended in the counter clockwise direction approximately 190 degrees to provide a mounting surface for the CO2 laser 42. The assist plug carriage 36, oscillate within the forming station and is driven by a means 35 that imparts the necessary constant acceleration, constant deceleration and synchronous motion to the assist plug carriage 36.

While the present invention has been described in one preferred embodiment, modifications and changes may be made without departing from the scope of the invention as claimed by me below.

I claim:

1. An apparatus for thermoforming plastic articles comprising:

a sheet extrusion die for extruding a sheet of thermoplastic;

a forming wheel comprised of a plurality of mold facets, each said mold facet containing at least one mold cavity;

means for rotating said forming wheel about an axis so that each said mold facet is moved through sectors dedicated to forming said sheet into said articles and ejecting said articles;

means for inducing an air pressure differential within said mold cavity thereby forming an article associated with each said mold cavity wherein portions of said sheet remain unformed;

said mold facets being comprised of a static upper mold facet section and a dynamic lower mold facet section, said dynamic lower mold facet section containing said mold cavity;

an ejection shoe; and means for actuating and guiding movement of said dynamic lower mold facet section towards said forming wheel axle at a predetermined ejecting sector during rotation of said forming wheel.

2. An apparatus according to claim 1, further comprising:

an end plate; and a lug assembly, said lug assembly being free to move within said end plate to compensate for differential thermal expansion between said mold facets and said forming wheel axle.

3. A method for thermoforming plastic articles comprising the steps of:

extruding thermoplastic material through a sheet extrusion die which is oriented on a 45 degree angle from the vertical and held at a fixed elevation to form an extruded sheet;

feeding said extruded sheet through a set of extrusion rolls each adapted to rotate about an axis so as to feed the extruded sheet down and away from the extrusion die, each axis of said extrusion rolls lying within a plane that is approximately 45 degrees from the vertical and perpendicular to the extrusion die;

providing a forming wheel comprised of a plurality of mold facets, each said mold facet being comprised of a static upper mold facet section and a dynamic lower mold facet section and said mold facet containing at least one mold cavity;

rotating at a rate consistent with the said thermoplastic sheet extrusion said forming wheel about a horizontal axis so that each said mold facet is moved through sectors dedicated to forming said sheet into said articles and ejecting said articles, said horizontal axis lying below and parallel to said plane defined by said extrusion roll axis;

casting said thermoplastic sheet onto said rotating forming wheel's circumference;

providing a thermoforming assist plug arranged over said forming sector of said forming wheel;

synchronizing movement of said thermoforming assist lug with the movement of said molding facets as said forming wheel rotates;

actuating said thermoforming assist plug into said thermoplastic sheet and said mold cavity while being synchronized in said forming sector;

evacuating air from within said mold cavity thereby forming an article associated with each said mold cavity wherein portions of said sheet remain unformed;

cooling said thermoplastic sheet;

actuating and guiding movement of said dynamic lower mold facet section towards said forming wheel axis when the means for actuating and guiding comes into contact with a stationary ejection shoe during rotation of said forming wheel;

removing said formed articles integral with said unformed portions of said sheet from the forming wheel;

conveying the said formed articles integral with said unformed portions of said sheet to a punch press;

punching said formed article from the unformed portions of said sheet;

grinding said unformed portions of said sheet into reclaimed scrap; and transferring said reclaimed scrap to extrusion system for reprocessing into new sheet.

4. An apparatus according to claim 1, further comprising;

a stationary intermittent actuating device, said intermittent actuating device being fixed on the apparatus in an ejection sector; and wherein said dynamic lower mold facet section is actuated by said intermittent actuating device which comes into and out of contact with said dynamic lower mold facet as the forming wheel rotates through the ejection sector.

5. An apparatus according to claim 1, further comprising;

a stationary cam plate, said stationary cam plate containing an enclosed cam track; and a guide rod assembly including a means for actuating and guiding movement of said dynamic lower mold facet section towards said forming wheel axis when the means for actuating and guiding follows said cam track in stationary cam plate during rotation of said forming wheel.

6. An apparatus according to claim 1, further comprising;

an actuating device mounted between said static upper mold facet and dynamic lower mold facet sections, said actuating device being constructed and arranged to guide movement of said dynamic lower mold facet section towards said forming wheel axis when the means for actuating and guiding is extended during rotation of said forming wheel through ejection sector.

7. An apparatus according to claim 1, further comprising:

a laser cutting apparatus, said laser cutting apparatus being arranged over said ejection sector of said forming wheel;

means for synchronizing movement of said laser cutting apparatus with the movement of said molding facets as said forming wheel rotates;

means for guiding said laser cutting apparatus over a pre-determined cutting profile so as to separate said article from the unformed portion of said sheet; and means for removing said article from said mold cavity.

8. An apparatus according to claim 1, wherein said means for actuating and guiding movement of said dynamic lower mold facet section towards said forming wheel axis comprises a guide rod assembly.

9. An apparatus according to claim 8 further comprising:

a guide rod head mounted to said guide rod assembly; and a lug assembly which is free to move within the guide rod head to compensate for differential thermal expansion between said mold facets and said forming wheel axle.

10. An apparatus according to claim 9, further comprising;

an actuating device mounted to said guide rod head, said actuating device being constructed and arranged to guide movement of said dynamic lower mold facet section towards said forming wheel axis when the means for actuating and guiding is retracted during rotation of said forming wheel through ejection sector.

11. An apparatus according to claim 1, further comprising a set of extrusion rolls each adapted to rotate about an axis so as to feed the extruded sheet away from the extrusion die.

12. An apparatus according to claim 1, further comprising:

a thermoforming assist plug wherein said assist plug is arranged over said forming sector of said forming wheel;

means for synchronizing movement of said thermoforming assist plug with the movement of said molding facets as said forming wheel rotates; and means for actuating said thermoforming assist plug into said thermoplastic sheet and said mold cavity.

13. A method for thermoforming plastic articles, comprising steps of:

extruding thermoplastic material through a sheet extrusion die to form an extruded sheet;

providing a forming wheel that includes a plurality of mold facets, each of said mold facets including a static upper mold facet section and a dynamic lower mold facet section, each such said dynamic lower mold facet section containing a mold cavity;

rotating the forming wheel about an axis so that each said mold facet is moved through sectors dedicated to forming said sheet into said articles and ejecting said articles;

casting the thermoplastic sheet onto the forming wheel and inducing said sheet to conform to said mold cavity so as to form articles out of the thermoplastic sheet within the respective mold cavities wherein portions of said sheet remain unformed;

cooling the articles;

actuating the dynamic lower mold facet section towards the forming wheel axis when the mold facet reaches a predetermined ejecting sector; and removing said formed articles from the forming wheel.

14. A method according to claim 13, further comprising steps of:

conveying the formed articles integral with said unformed portions of said sheet to a punch press;

punching the formed article from the unformed portions of said sheet;

grinding the unformed portions of said sheet into reclaimed scrap; and transferring said reclaimed scrap to extrusion system for reprocessing into new sheet.

15. A method according to claim 13, further comprising a step of positioning a laser cutting apparatus over said ejecting sector; and moving the laser cutting apparatus over a pre-determined cutting profile so as to separate the formed article from the unformed portion of the sheet.

* * * * *